Dec. 17, 1963 H. W. BAKER, JR 3,114,324
ROTARY MOTOR AND PUMP
Filed Feb. 17, 1961 10 Sheets-Sheet 1

FIG. 1

INVENTOR.
HAROLD W. BAKER JR.
BY
Busser, Smith & Harding
ATTORNEY

Dec. 17, 1963  H. W. BAKER, JR  3,114,324
ROTARY MOTOR AND PUMP
Filed Feb. 17, 1961  10 Sheets-Sheet 2

INVENTOR.
HAROLD W. BAKER JR.
BY
ATTORNEY

FIG. 5

INVENTOR.
HAROLD W. BAKER JR.
BY Busser, Smith & Harding
ATTORNEY

FIG. 6

Dec. 17, 1963  H. W. BAKER, JR  3,114,324
ROTARY MOTOR AND PUMP
Filed Feb. 17, 1961  10 Sheets-Sheet 5

FIG. 7

INVENTOR.
HAROLD W. BAKER JR.
BY
Besser, Smith & Harding
ATTORNEY

*INVENTOR.*
HAROLD W. BAKER JR.

Dec. 17, 1963 H. W. BAKER, JR 3,114,324
ROTARY MOTOR AND PUMP
Filed Feb. 17, 1961 10 Sheets-Sheet 8

INVENTOR.
HAROLD W. BAKER JR.
BY
Busser, Smith & Harding
ATTORNEY

Dec. 17, 1963    H. W. BAKER, JR    3,114,324
ROTARY MOTOR AND PUMP
Filed Feb. 17, 1961    10 Sheets-Sheet 9

FIG. 18

INVENTOR.
HAROLD W. BAKER JR.
BY
Bresser, Smith &Harding
ATTORNEY

Dec. 17, 1963  H. W. BAKER, JR  3,114,324
ROTARY MOTOR AND PUMP
Filed Feb. 17, 1961  10 Sheets-Sheet 10

INVENTOR.
HAROLD W. BAKER JR.
BY
*Besser, Smith & Harding*
ATTORNEY

United States Patent Office 3,114,324
Patented Dec. 17, 1963

3,114,324
ROTARY MOTOR AND PUMP
Harold W. Baker, Jr., % Roton Inc., P.O. Box 386
Bryn Mawr, Pa.
Filed Feb. 17, 1961, Ser. No. 90,057
20 Claims. (Cl. 103—140)

This invention relates generally to fluid motors, and particularly to improvements in a rotary fluid motor that is capable of functioning as a pump as well as a motor.

An important object of the invention is to mount the impeller vanes or blades of a rotary fluid motor upon shafts carried by a rotor for orbital movement about stationary cam means adapted for controlling and operatively orienting effectively each blade mounting shaft throughout a complete revolution of the rotor.

Another object of the invention is to provide means for mounting the rotor of such a motor between opposed walls of a stationary housing in such a manner that a very slight clearance is maintained between each end of the rotor and the opposed wall of the housing whereby to reduce friction between the rotor and the housing to a minimum.

Another object of the invention is to provide such a motor with a valve segment of a length to provide long leakage paths along the valve segment from the high pressure area to the low pressure area of the pumping chamber, thereby to provide an effective seal against fluid leakage.

Another object of the invention is to provide a motor with such a valve segment and impeller blades arranged to skirt the valve segment with clearance sufficient to accommodate back-lash in the blade indexing system.

Another object of the invention is to provide such a motor with preloaded cam followers carried by the impeller blade shafts and effective to reduce cam slap to a minimum, and to dampen out noise caused by irregular cam surfaces.

Another object of the invention is to arrange such a motor so as to effect hydraulic balance axially of the motor, as well as radially of the motor.

Another object of the invention is to provide such a motor with a chamber having recessed walls accommodating the impeller blades, the edges of impeller blades under load being engaged with the recessed wall areas for positive support of said blades by said chamber walls.

Another object of the invention is to provide such a motor with a rotor assembly sealed against the ingress of fluids, in consequence of which the motor may be used as a pump for effectively handling non-lubricating fluids.

Other objects of the invention will become apparent from the following description when read with reference to the accompanying drawings, in which.

Referring to the drawings, and particularly to FIGURES 1 to 8 and 12 and 13, a motor constructed in accordance with the invention comprises a casing, generally designated 10, having a generally cylindrical central section 12, an outboard end section 14 and an inboard end section 16, all fastened together by studs 18, an O-ring seal 20 being intersected between the central section 12 and each of the end sections 14 and 16. Nested in the outboard end section 14 is a valve plate 22, and nested in the inboard end section 16 is a valve plate 24. At each end thereof the central section 12 of the casing is provided with an axially extending flange 26 projecting into the associated end section of the casing. Each valve plate is fitted somewhat loosely between the central section 12 of the casing and the associated end section of the casing thereby to provide for slight floating movement of the valve plate axially of the unit. Dowels, designated 27, are affixed to the end sections and slidably project into the valve plates and secure the same against rotation. Interposed between each valve plate and the end section into which it is fitted is an O-ring seal 28.

Figure 1:
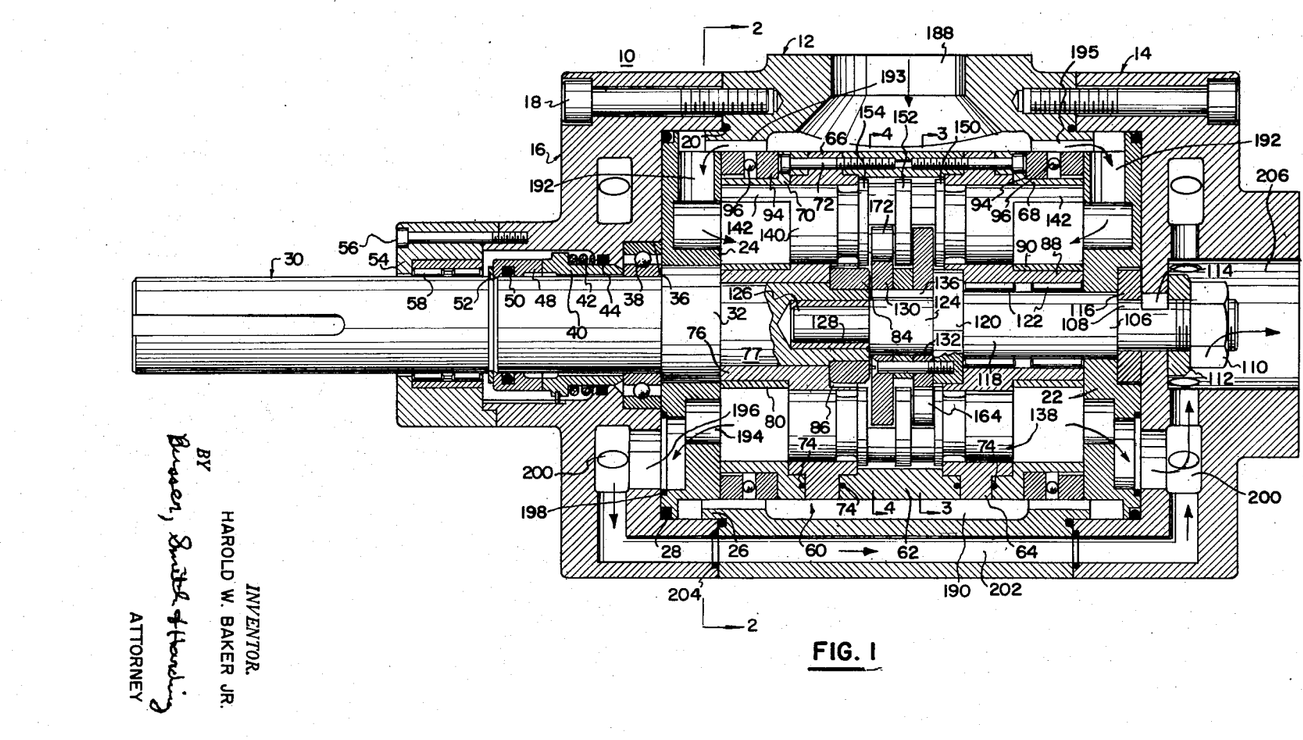
FIGURE 1 is a longitudinal section through the motor.

Extending centrally through the casing section 16 and the valve plate 24 is a shaft 30 having formed thereon a circumferentially extending flange 32. Next to the flange 32 is an annular recess 36 formed in the end section 16 and accommodating a ball bearing unit 38 fitted over the shaft 30. Next to the ball bearing unit is a sleeve 40 and interposed between this sleeve and the casing section 16 are a compression spring 42 and an O-ring seal 44. Next to the sleeve 40 is a collar 48 housing an O-ring seal 50. The sleeve 40 and collar 48 are secured against axial displacement by a retaining ring 52. A cap 54 is fitted over the shaft 30 and is secured to the casing section 16 by studs 56. The cap 54 houses a roller bearing unit 58.

The interior of the casing 10 accommodates a rotor 60 having a cylindrical section 62, an outboard end plate 64, an inboard end plate 66, an outboard blade ring 68 and an inboard blade ring 70, all secured together as by studs 72. Interposed between the central rotor section 62 and each of the end plates 64 and 66, and between each of the latter and the associated blade ring is an O-ring seal 74. The inboard end plate 66 is provided with an axially extending hub 76 which is fitted over a portion of the shaft 30, designated 77, adjacent the flange 32, being secured thereto by a key 78. A bushing 80 is fitted over the hub 76 and is secured thereto by a pair of keys 82. A nut 84 is threaded upon the terminal portion of the shaft 30 and is lodged in a recess 86 formed in the end plate 66. The outboard end plate 64 is provided with an axially extending hub 88, and fitted over this hub is a bushing 90 secured thereto by a pair of keys 92.

At each end of the rotor is an annular recess 94 formed in the associated blade ring and accommodating a thrust bearing unit 96 provided with an inner ring 98 press fitted into place, an outer ring 100 and an intermediate ring 102, the latter being suitably provided with a series of circumferentially spaced balls 104. The overall axial length of each unit 96 is sufficient for holding the associated valve plate in axially spaced relation to the end of the rotor, the clearance being in the order of 0.00015 of an inch to 0.00020 of an inch.

Extending into the rotor is a cam shaft 106 having a main body section 118 and a reduced diameter terminal portion 108. The latter extends into the casing section 14 and mounts an annulus 116. The body section 118 and the annulus 116 are drawn tight against the casing section 14 by means of a washer 112 and a nut 110 threaded upon the terminal shaft portion 108, which is secured to the casing section 14 by a key 114. The shaft is provided with a flange 120, and interposed between the shaft section 118 and the hub 88 of the plate 64 is a roller bearing unit 122. Next to the flange 120 is a shaft section 124 terminating in a shaft portion 126 reduced in diameter. The shaft 30 is fitted with a bushing 128 which turns on and carries the terminal portion 126 of the cam shaft. Fitted over the cam shaft portion 124 are a pair of cams 130 and 132 separated by a suitable spacer ring and secured to the flange 120 by screws 134 and to the shaft section 124 by a key 136.

Figure 8:
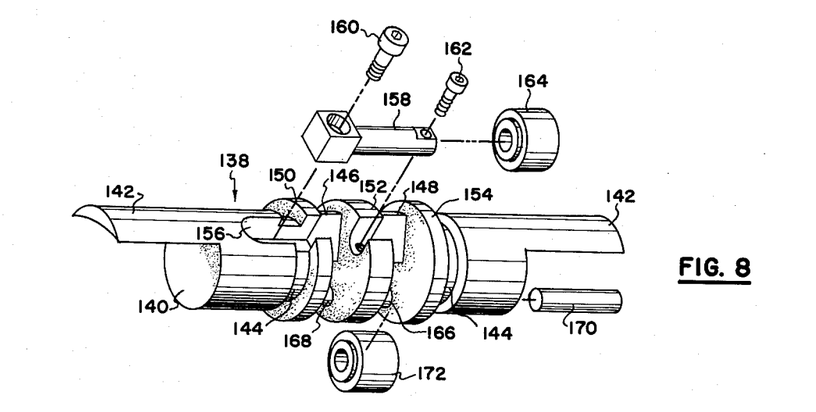
FIGURE 8 is an exploded perspective view of the impeller blade shaft.

Carried by the rotor 60 are a set of impeller blade shafts 138, at each end of which is a section 140 from which there extends an impeller blade 142, which is crescent-shaped in transverse section, as shown. Next to the section 140 is an annular recess 144 and between these annular recesses is an enlarged diameter shaft section having axially spaced recesses 146 and 148 which form with the recesses 144 axially spaced flanges 150, 152 and 154. The shaft is provided with an axially extending depression 156 into which is fitted a pintle 158 secured in position by a pair of screws 160 and 162. The pintle or pin 158 mounts a cam follower roller 164 which is disposed in the recess 146. The shaft is also provided with axially extending openings 166 and 168 which accommodate a pin 170 which mounts a cam follower roller 172 disposed in the recess 148. The blades 142 disposed respectively at opposite ends of the shaft 138 are axially aligned and the rollers 164 and 172 are angularly spaced 180 degrees apart about the axis of the shaft, as shown. The end plates 64 and 66 of the rotor are provided with circumferentially spaced openings 174 which turnably receive respectively the impeller shaft portions 140. The flanges 150 of the blade shafts abut the end plate 64, and the flanges 154 abut the end plate 66. The blades at each end of the rotor extend into the annular channel between the blade ring and the associated bushing.

Figures 2, 3, 4:
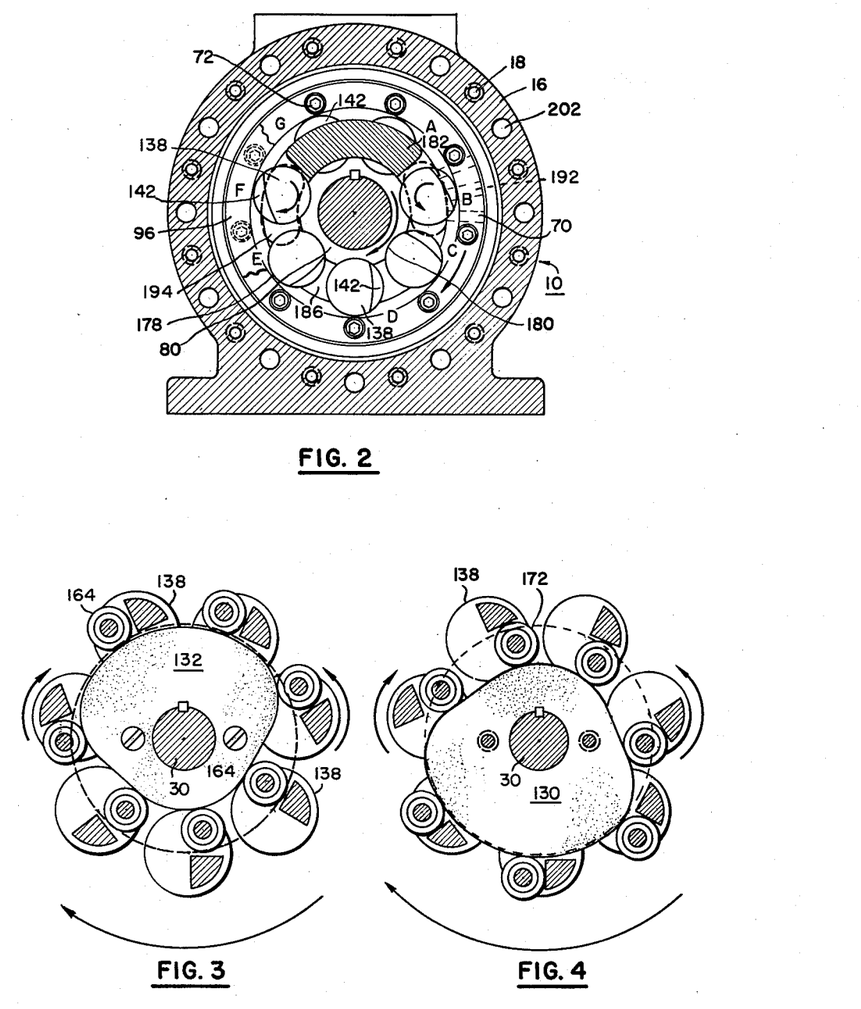
FIGURE 2 is a section on a plane indicated by line 2—2 of FIGURE 1.
FIGURE 3 is a section on a plane indicated by line 3—3 of FIGURE 1.
FIGURE 4 is a section on a plane indicated by line 4—4 of FIGURE 1.
Figure 5:
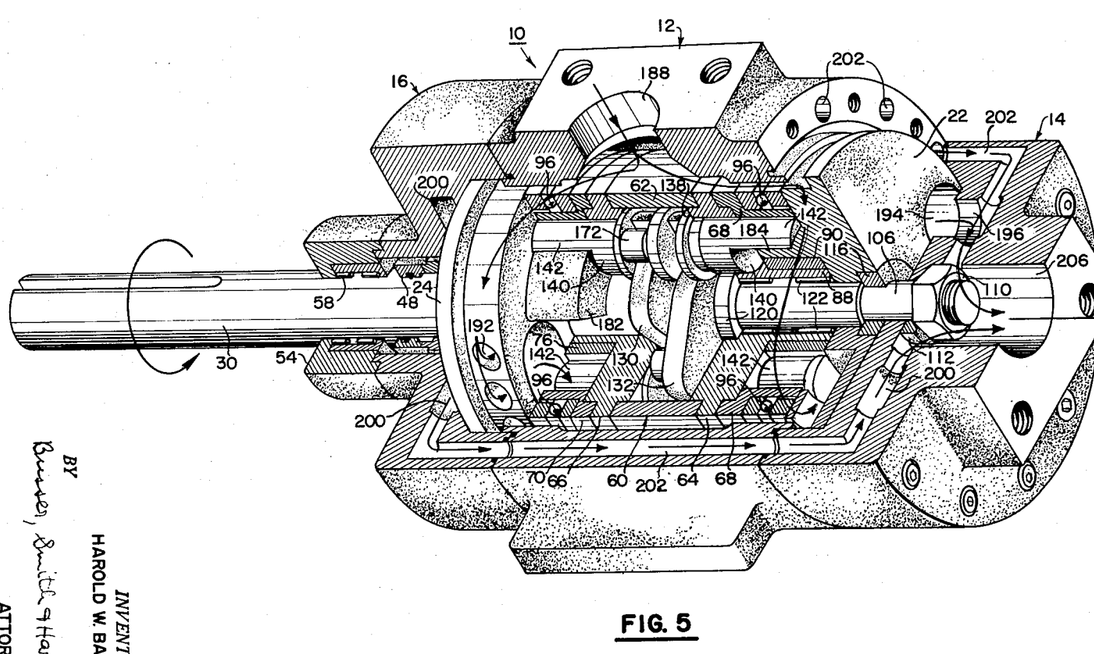
FIGURE 5 is a perspective view of the motor, a quarter section of the outer casing and rotor being cut away to expose the interior thereof.
Figure 6:
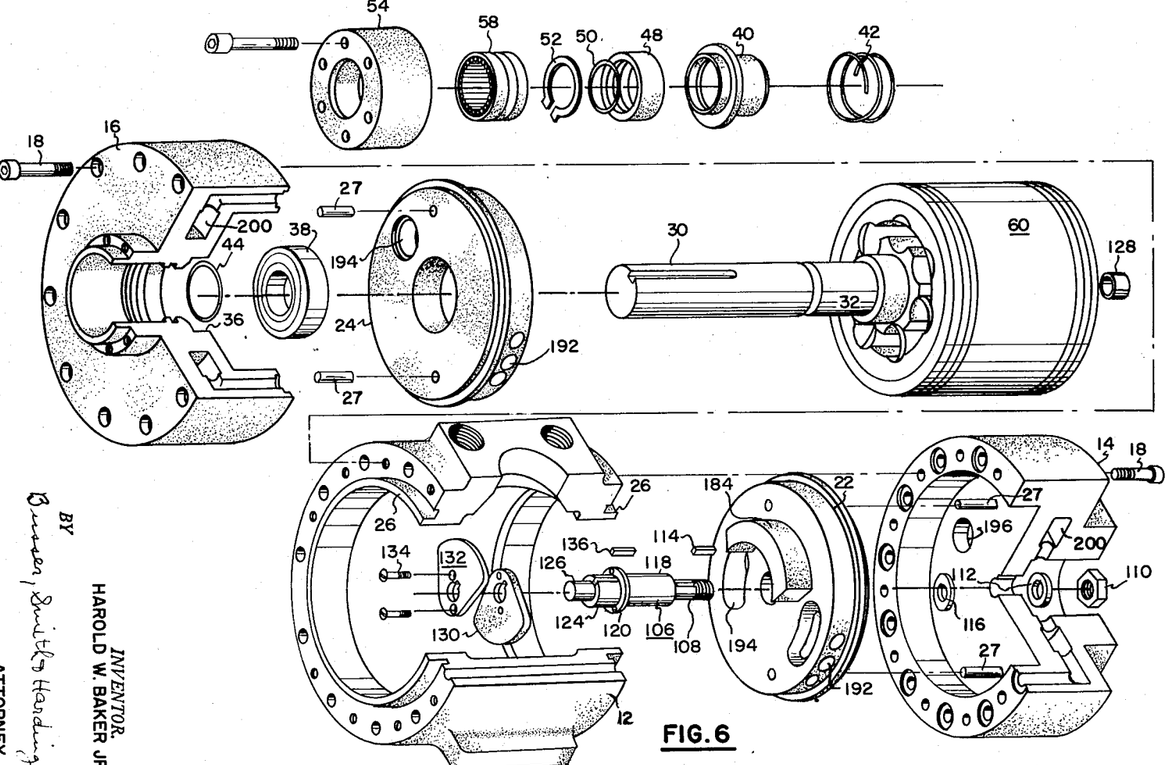
FIGURE 6 is an exploded perspective view of the rotor.
Figure 7:
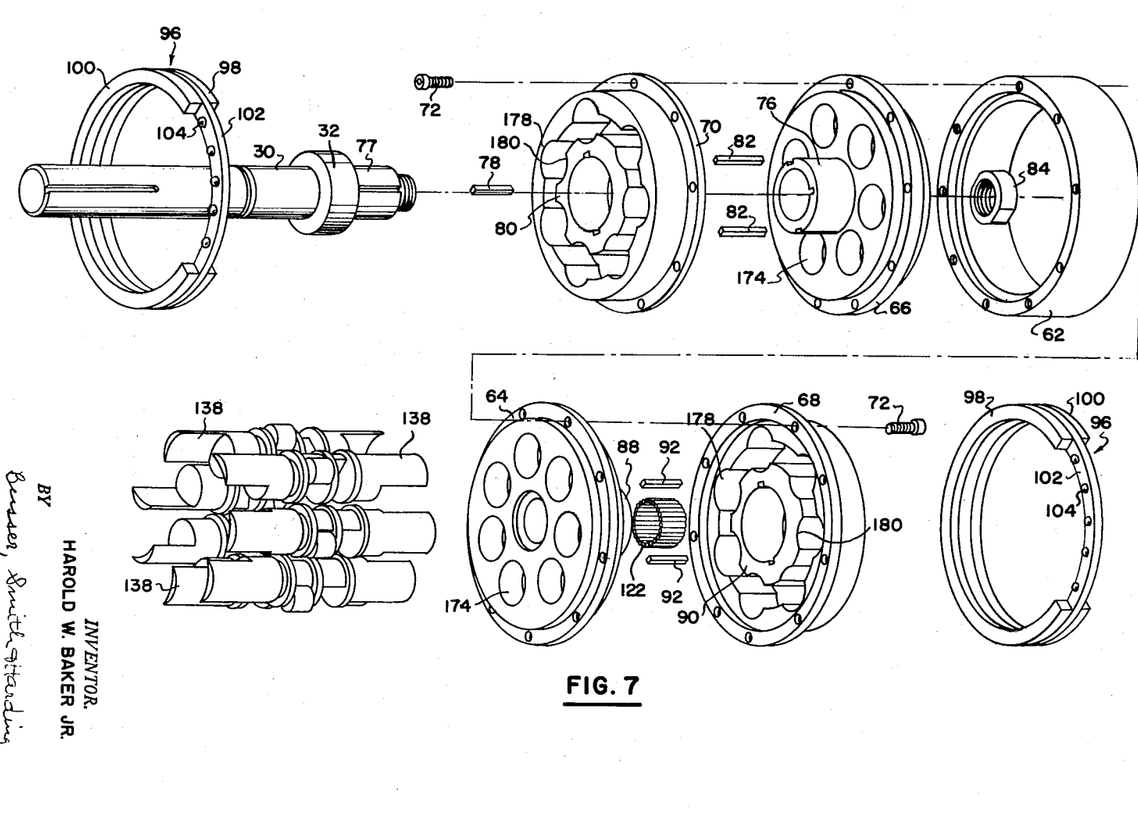
FIGURE 7 is an exploded perspective view of the rotor.

Referring particularly to FIGURE 2, the blade ring 70 is provided with a series of circumferentially spaced arcuate recesses 178, and the bushing 80 is provided with a series of arcuately shaped recesses 180. Extending into the annular channel between the blade ring 70 and bushing 80 is an arcuate valve segment 182 formed on the valve plate 24. At the opposite end of the unit is an arcuate valve segment 184 formed on the valve plate 22 and extending axially into the annular channel between the blade ring 68 and the bushing 90. Referring again to FIGURE 2, the pump chamber, designated 186, is concentric with the impeller blade shaft circle and is of a width substantially less than the diameter of the impeller blade shafts. The blades 142 are crescent-shaped in transverse section and are adapted for retraction into the arcuate recesses 178 formed in the blade ring.

As shown, end plate 66, blade ring 70 and bushing 80 conjointly make up an end wall having formed therein the pumping chamber 186 at the inboard end of the rotor, and having formed therein openings for receiving the impeller blade shafts; and end plate 64, blade ring 68 and bushing 90 conjointly make up an end wall having formed therein the pumping chamber at the outboard end of the rotor, and having formed therein openings for receiving the impeller blade shafts. The multi-part construction illustrated facilitates fabrication, but it will be apparent that the outboard and inboard end walls of the rotor may be formed in a different manner, e.g., each might be formed in one piece.

The fluid inlet passage comprises an inlet port 188 communicating with an annular space 190 extending about the rotor. At the inboard end of the unit, the space 190 communicates with an axially extending annular channel, designated 193, between the rotor and the flange 26 of the central casing section 12. The channel 193 communicates with the outer ends of several radially extending openings 192 formed in the valve plate 24. The inner ends of the openings 192 communicate with a kidney-shaped opening, which in turn communicates with the pump chamber 186. The fluid inlet passage at the outboard end of the unit is similar to that at the inboard end, the channel between the rotor and the flange 26 being designated 195.

The fluid discharge passage comprises a pair of openings 194 formed respectively in the valve plates 22 and 24 and communicating with a pair of openings 196 formed respectively in the casing sections 14 and 16. Between each valve plate and the associated casing section, where the openings 194 and 196 register, suitable O-ring seals 198 are provided. The openings 196 communicate with a pair of annular channels 200 respectively formed in the casing sections 14 and 16, and these annular channels communicate with one another through a series of passages 202. At the junction of the casing section 12 and each of the casing sections 14 and 16 suitable O-ring seals 204 are provided extending about the passages 202. At the outboard end of the casing the annular channel 200 communicates with a fluid outlet port 206.

Figure 9:
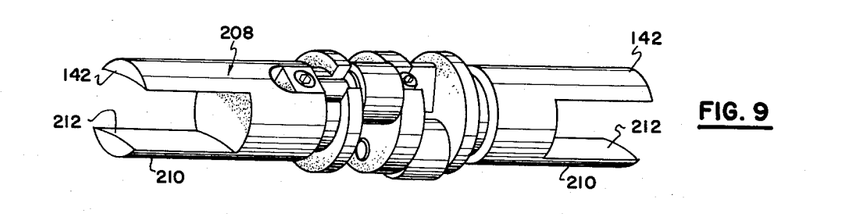
FIGURES 9, 10 and 11 are perspective views of modified forms of the impeller blade shaft.
Figure 10:
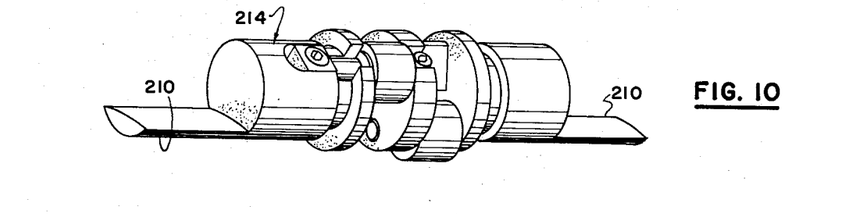
Figure 11:
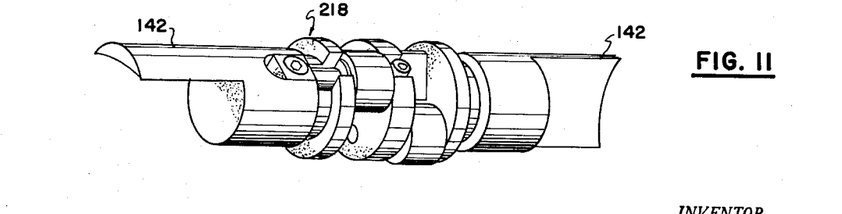

FIGURE 9 shows a modified form of the impeller blade shaft, generally designated 208. This modified impeller blade shaft is identical to that shown in FIGURE 8 except that each end of the shaft is provided with an additional impeller blade 210 disposed diametrically opposite the impeller blade 142 and provided with a convex, instead of a concave inner surface 212. The impeller blade 210 is adapted for retraction fully into one of the recesses 180 formed on the bushing 80 or 90. FIGURE 10 shows another modification of the impeller blade shaft, generally designated 214. This impeller blade shaft is identical to that shown in FIGURE 9 except for the omission of the impeller blades 142. FIGURE 11 shows still another modified form of the impeller blade shaft, designated 218. This impeller blade shaft is identical to that shown in FIGURE 8 except that the impeller blades are angularly displaced relative to one another about the axis of the shaft.

Figure 12:
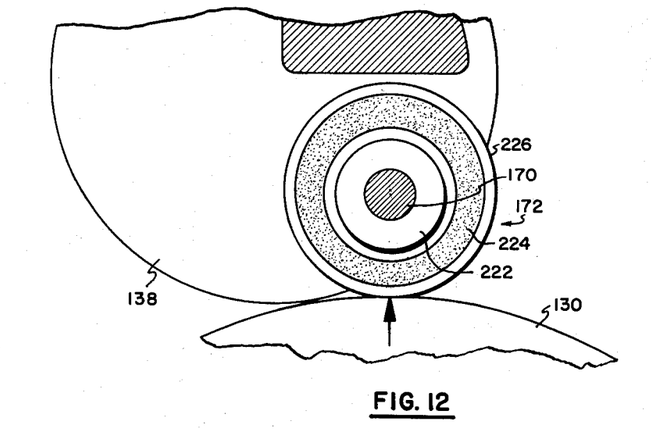
FIGURE 12 is a fragmentary view of an impeller blade shaft mounting a cushioned cam follower engaging one of the cams.
Figure 13:
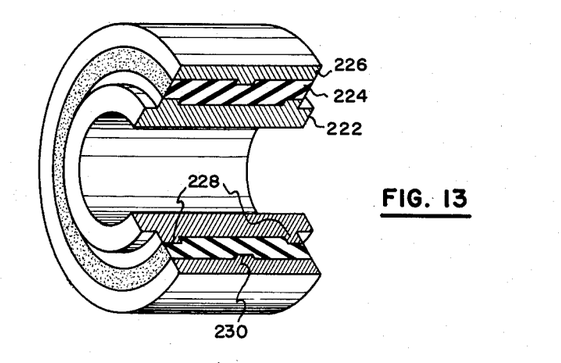
FIGURE 13 is a cut away perspective view of a cushioned cam follower roller.

Now referring to FIGURES 12 and 13, each cam follower roller, for example roller 172, is provided with an inner sleeve 222 over which is fitted a rubber sleeve 224 and an outer rim 226. The inner sleeve 222 is provided with axially spaced circumferentially extending ribs 228 which extend radially into the rubber sleeve 224 and the outer rim 226 is provided with a circumferentially extending rib 230 extending radially into the rubber sleeve 224.

Figure 14:
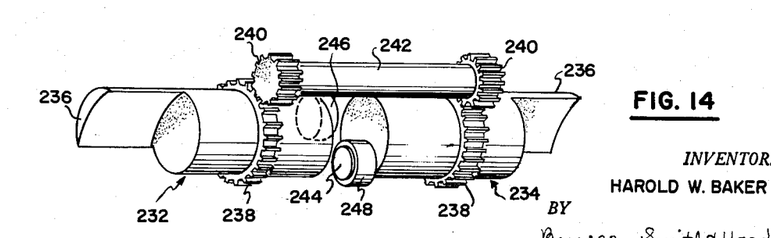
FIGURE 14 is a perspective view of an alternate impeller blade assembly.

FIGURE 14 shows an impeller blade assembly comprising axially spaced coaxial impeller blade shafts 232 and 234 each terminating in an impeller blade 236, which is crescent-shaped in transverse section. Each blade shaft mounts a gear 238 which meshes with a pinion 240. These pinions are affixed respectively to opposite end portions of a shaft 242 suitably journalled in the rotor (by means not shown). The blade shafts carry pins 244 resiliently mounting cam follower rollers, the roller associated with the shaft 232 being designated 246, and the roller associated with the shaft 234 being designated 248. The shaft 242, through the pinions 240 and gears 238, is operative to maintain the blades 236 in angular alignment and the rollers 246 and 248 angularly spaced from each other 180 degrees about the axis of the shafts 232 and 234. It will be understood that the shafts 232 and 234 are journalled in the rotor in the manner indicated hereinbefore in connection with the impeller blade shaft 138.

Figure 15:
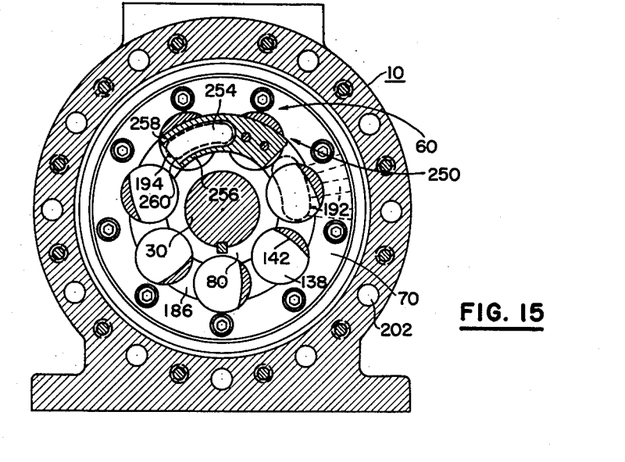
FIGURE 15 is similar to FIGURE 2, but shows a modified valve segment.
Figure 16:
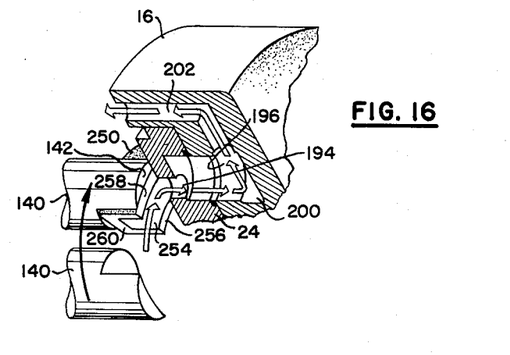
FIGURE 16 is a cut away perspective view of the construction shown in FIGURE 15.
Figure 17:
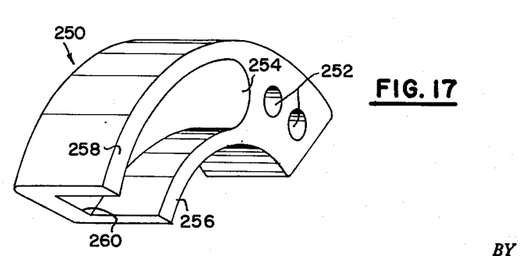
FIGURE 17 is a perspective view of the modified valve segment.

FIGURES 15, 16 and 17 show a modified form of the valve segment, generally designated 250. This modified valve segment is arcuate in shape and, like the valve segment 182, extends into the annular channel between the blade ring 70 and bushing 80. One end portion of the valve segment is affixed to the valve plate 24, as by screws (not shown) extending through openings 252. The opposite end portion is channeled on the side thereof facing the valve plate, as at 254, and the channel registers with the discharge port 194. The opposite side walls of the channel respectively designated 256 and 258, and the bottom wall of the channel, designated 260, are relatively thin.

Figure 18:
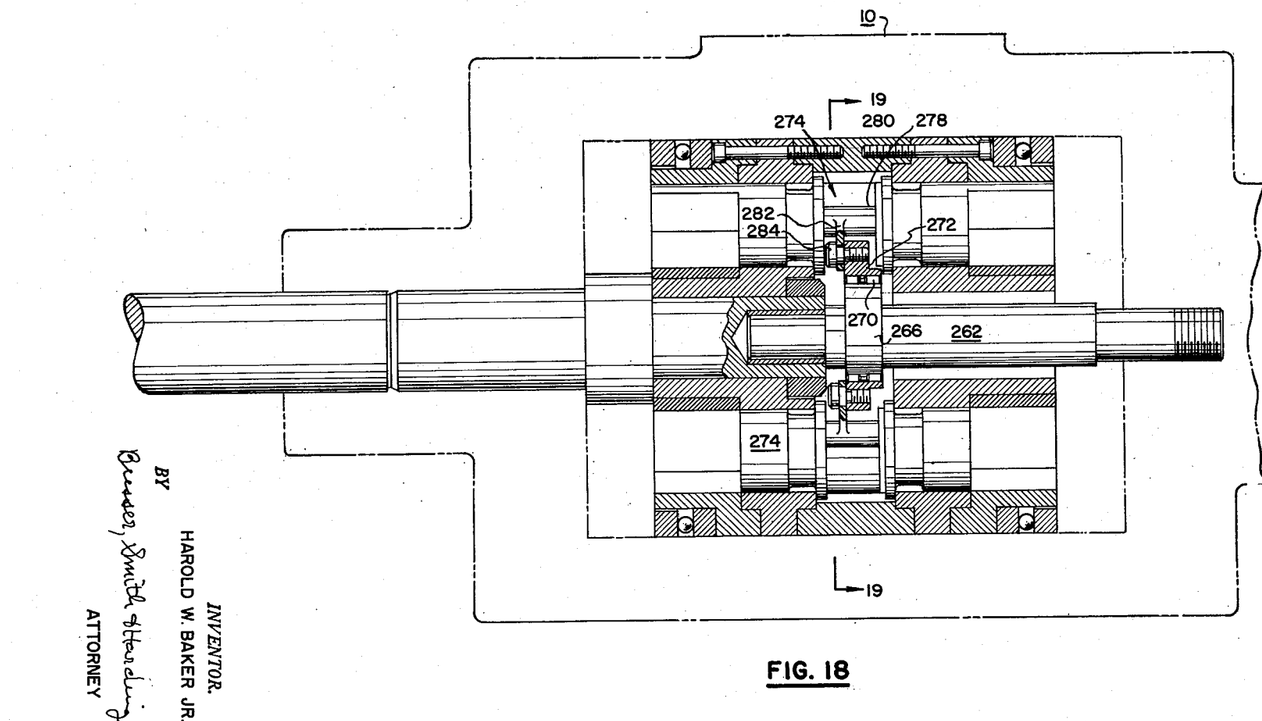
FIGURE 18 is similar to FIGURE 1, but shows modified means for controlling the blade shafts.
Figure 19:
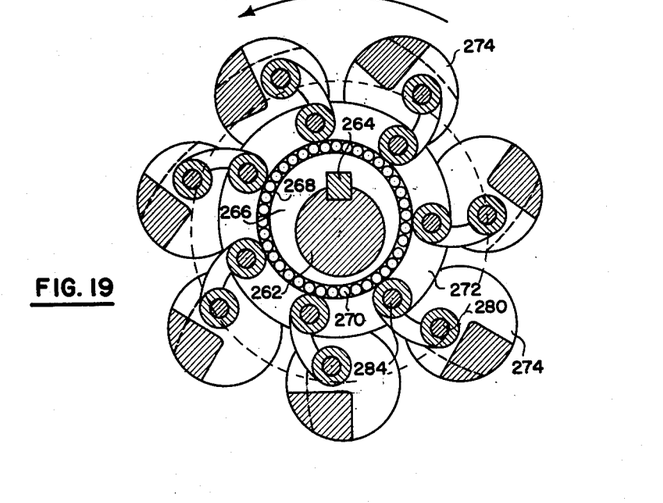
FIGURE 19 is a section on a plane indicated by line 19—19 of FIGURE 18.
Figure 20:
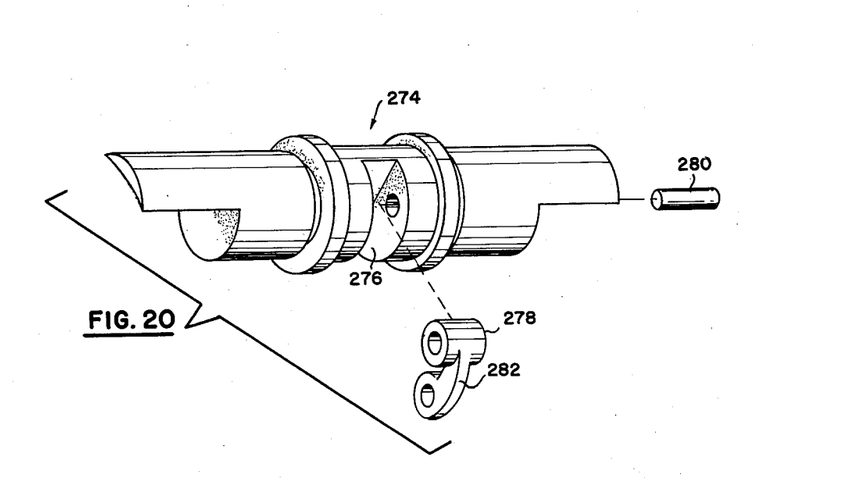
FIGURE 20 is an exploded perspective view of the impeller blade shaft and an associated arm shown in FIGURES 18 and 19.

FIGURES 18, 19 and 20 show modified means for positively controlling orientation of the impeller blade shafts and the blades carried thereby. Affixed to the cam shaft, designated 262, as by a key 264, is a disc 266 provided with a circular cam surface 268. Embracing the disc 266 is a roller bearing unit 270 over which is fitted a ring 272.

Each impeller blade shaft, designated 274, is provided with a recess 276 extending into the side thereof, and fitted into this recess is a cylindrical body 278 mounted upon a pin 280 having opposite end portions affixed respectively to the opposite side walls of the recess 276. The body 278 is one end portion of a link 282, which is connected to the ring 272 by its opposite end portion by means of a pin 284, the pins 284 being circumferentially spaced equally about the ring 272. It will be understood that the blade shaft circle is concentric with the cam shaft 262, the ring 272 is concentric with the cam 268, and the ring 272 and cam 268 are eccentrically disposed with respect to the cam shaft 262.

In the operation of the unit, fluid under pressure enters the casing through the inlet port 188 and circulates in the space 190 extending about the rotor. At each end of the rotor, from this space 190 the fluid passes through the space 193 and enters the several openings 192, from whence it passes into the pump chamber 186 and from this chamber to the opening 194. From the opening 194 the fluid passes through the opening 196 into the annular channel 200. The fluid in the inboard channel 200 passes through the several passages 202 to the outboard annular channel 200, from whence all of the fluid is discharged from the motor through the discharge port 206. It will be apparent that as the fluid passes through the chambers 186, it pushes the impeller blades before it, in consequence of which the rotor 60 and its shaft 30 are actuated.

Referring particularly to FIGURES 3 and 4, the cams 130 and 132 are complementary and designed conjointly to positively control orientation of the shafts 138 and the blades carried thereby. For this purpose the cam followers 164 and 172 carried by each shaft 138 are always engaged respectively with the cams 132 and 130. In this connection, the following should be noted: The impeller blade circle is of such a diameter that all of the cam followers 164 and 172 are normally preloaded, i.e., the associated cam applies to each cam follower a radially inward pressure sufficient to push its outer rim 226 off-center by deforming the rubber sleeve 224. When the pressure is partially or wholly relieved, as by reason of an irregularity in the cam surface, the rubber sleeve tends to return to its undeformed shape and the outer rim 226 tends to move toward a position concentric relative to the axis of the pin upon which the cam follower is mounted, maintaining contact with the cam. Thus cam slap is reduced to a minimum and noise caused by irregular cam surfaces is dampened.

Referring particularly to FIGURE 2, rotation of the rotor is clockwise, as indicated by the arrow. The seven significant positions which each blade assumes in one complete revolution of the rotor are shown. In position A the impeller blade is fully feathered and retracted completely into the associated arcuate recess 178 formed in the blade ring 70. In position B the blade has rotated counterclockwise somewhat from the fully feathered position shown at A to a partially unfeathered position. In position C the blade has turned counterclockwise to fully unfeathered, working position, in which position the inner edge thereof has entered the associated arcuate recess 180 formed in the bushing 80. The blade remains in working position through positions D and E. In position F the blade has turned clockwise somewhat and is in partially feathered position. In position G the blade is again fully feathered and retracted completely into the blade ring, a position which it maintains until it reaches position A.

Referring to FIGURE 2, fluid enters the chamber 186 through the openings 192 adjacent on end of the valve segment 182. Acting against the blades in positions C, D and E, it turns the rotor and is discharged from the chamber 186 through the opening 194 adjacent the opposite end of the valve segment 182.

Referring to the modified means for positively controlling orientation of the impeller blade shafts (see FIGURES 18, 19 and 20), which means is particularly suited for single cycle high-speed low-pressure applications, the center-to-center distance between the shaft 262 and an impeller shaft 274 is fixed. In addition, the center-to-center distances between the shaft 274 and its pin 280, and between the pins 280 and 284 are fixed. However, the center-to-center distance between the pin 284 and the shaft 262 varies as the shaft 274 orbits about the shaft 262, as a consequence of which the shaft 274 rocks as required about its own axis as it obits about the shaft 262.

It will be understood that the valve plates 22 and 24 are so oriented with respect to one another that the kidney-shaped openings at the inner ends of openings 192 formed respectively in these plates are aligned, and the pair of openings 194 formed respectively in these plates are aligned. Thus not only is the fluid pressure acting at each end of the rotor radially balanced, but the fluid pressure acting against one end of the rotor is balanced by the fluid pressure acting axially against the opposite end of the rotor.

It will be apparent that the motor may be reversed by merely reversing the flow of fluid under pressure. In addition, the motor may be employed as a pump as well as a motor and the motor or pump will operate with fluids which are either liquids or gases, as, for example, oil, water, air, etc. When employed as a pump the device is actuated by power applied to the shaft 30. Fluid to be pumped moves along the path already indicated, but the direction of flow will depend upon the direction in which the shaft 30 is turned. It will be understood that in this case the fluid passes through the chambers 186 by reason of being pushed by the impeller blades 138.

To facilitate assembly and assure proper operation of a motor or pump unit, suitable clearances must be allowed between parts that are to move relative to each other. These clearances may be very small, but nevertheless they give rise to a certain amount of movement of the impeller blades about the axes of the blade shafts. In high pressure units this movement, known as back-lash, must be taken into consideration, and some provision must be made to take care of it. To this end, the inner surface of an impeller blade 142 is arcuately shaped. When the blade is in its fully feathered position, the center of this arc is coincident with the center of the shaft 30. The radius of the arc is slightly greater than the radius of the inner periphery of the blade ring. Thus, when the blade is fully retracted into the blade ring, as in positions A and G, there is sufficient clearance between the outer periphery of the valve segment 182 and the opposed surface of the impeller blade to allow for slight movement of the impeller blade about the center of the impeller blade shaft, the movement being sufficient to accommodate back-lash.

Referring again to operation of the motor, and particularly to FIGURE 2, at position B, i.e., at the inlet port or kidney-shaped opening at the inner end of the openings 192, the impeller blade is turning about its own central axis from feathered to working position. Between positions C and E, i.e., between the inlet port and the discharge port 194, the blade does not turn about its axis, i.e., it dwells in working position. Between positions E and G, i.e., at the discharge port 194, the blade turns about its axis from working to feathered position. Between positions G and A the blade dwells in feathered position while passing about the valve segment 182.

Thus while the blades and the shafts upon which they are mounted orbit continuously about the central axis of the rotor, the turning movement of an impeller blade about the axis of the shaft upon which it is mounted is intermittent, the arrangement being such that the blade feathers or unfeathers only when it is opposite an inlet or outlet port, and dwells when it is between said ports. The advantages stemming from such an arrangement are important and will be pointed out hereinafter.

When the unit is being used as a pump, the fluid pressure at the discharge port 194 (at position F) is maximum. The fluid pressure between positions E and C is somewhat lower and that at the inlet port (at position B) is still lower, in consequence of which the tendency is for fluid to leak past the blades that are in working position from the discharge port 194 toward the inlet port. Therefore, the long leakage paths provided along the edges of the blades when they are in working position are of prime importance. The substantial contacting surface areas provide an excellent seal against the fluid leakage caused by the back pressure as aforesaid.

In addition, since there is a considerable difference between inlet and discharge fluid pressures, and since the inlet port and the discharge port are respectively at opposite ends of the valve segment 182, there is a tendency for fluid to leak past the valve segment from the high pressure toward the low pressure end thereof. Therefore, the arcuate extent of the valve segment 182 is of prime importance. This valve segment subtends an angle approximately equal to twice the angular spacing of the impeller blade shafts about the axis of the shaft 30. Thus long leakage paths are interposed between the high and low pressure ends of the valve segment 182. In this connection, referring to FIGURES 15, 16 and 17, fluid in the chamber 186 enters the channel 254 in the valve segment 250 and, as indicated by arrows, from there passes to the discharge port 194 in the valve plate 24. The pressure of the fluid acting against the base wall 260 of the channel 254 tends to push the channeled end of the valve segment away from the valve plate 24 and to spread the opposite side walls 256 and 258 of the channel 254. Thus close contact is established between the base wall 260 of the channel 254 and the bottom of the chamber 186 and between the opposite side walls 256 and 258 of the channel 254 and the opposite side walls of the chamber 186, as a consequence of which it is made even more difficult for fluid to leak past the valve segment 250.

Since an impeller blade feathers or unfeathers only when it is opposite an inlet or discharge port, and since fluid pressure on one side of a blade, when it is in the vicinity of an inlet or discharge port, is equal and opposite to the fluid pressure on the opposite side of the blade, a blade is feathered or unfeathered under minimum hydraulic load conditions. As indicated, a blade shaft dwells while in working position, as a consequence of which it does not have high frictional resistance to overcome, as it would have if it turned in its bearings while in working position.

As noted hereinbefore, the valve plates may float axially of the unit a slight amount, between the central section 12 and the end sections of the casing. Fluid pressure acts to urge the valve plates respectively toward the opposite ends of the rotor. However, the thrust bearing units 96 maintain slight clearances between the valve plates and the ends of the rotor, thus reducing friction and effecting a substantial increase in the efficiency of the unit.

It will be understood, of course, that the present invention is susceptible of various modifications which may be made without departing from the general principles of the invention. Accordingly, it is intended to claim the same broadly as well as specifically, as indicated by the appended claims.

What is claimed is:

1. In a unit capable of functioning as a motor or as a pump, the combination comprising a casing, a principal shaft journalled in said casing, a hollow rotor carried by said principal shaft and having cross-axially extending opposite end walls, a plate valve non-revolvably interposed between said casing and each cross-axially extending opposite end wall of said rotor, each of said plate valves being adapted for movement toward the associated end of said rotor under the urging of fluid pressure, a plurality of shafts carried by said rotor and rockably mounted therein, impeller blades fixedly secured to said rockable shafts, means providing a pumping chamber in each of said rotor walls for the reception of impeller blades, said pumping chambers being closed respectively by said plate valves, thrust bearing means operatively interposed between said plate valves and rotor and maintaining the surface of each plate valve and the opposed surface of said rotor in close spaced relation to each other, cam means within said rotor for rocking said blade shafts when the blade shafts are moved about said cam means by said rotor thereby to turn each blade as it enters its pumping chamber for movement through the pumping chamber with the broad side thereof leading, and to turn each blade as it leaves the pumping chamber for movement with a narrow edge leading, and means providing fluid inlet and discharge passages communicating with said pumping chambers.

2. In a unit capable of functioning as a motor or as a pump, the combination comprising a casing, a principal shaft journalled in said casing, a hollow rotor carried by said principal shaft and having cross-axially extending opposite end walls, a plate valve non-revolvably interposed between said casing and each cross-axially extending opposite end wall of said rotor, each of said plate valves being adapted for movement toward the associated end of said rotor under the urging of fluid pressure, a plurality of shafts carried by said rotor and rockably mounted therein, impeller blades fixedly secured to said rockable shafts, means providing a pumping chamber in each of said rotor walls for the reception of impeller blades, said pumping chambers being closed respectively by said plates valves, a pair of thrust bearings, each operatively interposed between one of said plate valves and the opposed one of said rotor walls and maintaining the opposed surfaces thereof in close spaced relation to each other, cam means within said rotor for rocking said blade shafts when the blade shafts are moved about said cam means by said rotor thereby to turn each blade as it enters its pumping chamber for movement through the pumping chamber with the broad side thereof leading, and to turn each blade as it leaves the pumping chamber for movement with a narrow edge leading, and means providing fluid inlet and discharge passages communicating with said pumping chambers.

3. In a unit capable of functioning as a motor or as a pump, the combination comprising a casing, a hollow rotor within said casing and having a cross-axially extending end wall opposed to a wall area of said casing, a series of shafts circumferentially spaced about said rotor and rockably mounted therein, impeller blades fixedly secured to said rockable shafts, an element affixed to said wall area of the casing and disposed in an annular channel formed in said rotor wall, said element occupying a section of said channel of a length sufficient to subtend an angle substantially greater than the angular spacing between said blade shafts, thus forming of the unobstructed section of said channel an effective pumping chamber for the reception of said blades, cam means within said rotor for rocking said shafts when they are moved about said cam means by said rotor thereby to turn each blade as it enters said pumping chamber for movement with the broad side thereof leading, and to turn said blade as it leaves said pumping chamber for movement with a narrow edge leading, each blade being adapted for retracting into a wall of said channel for passing by said element, and means providing fluid inlet and discharge passages communicating with said pumping chamber.

4. In a unit capable of functioning as a motor or as a pump, the combination comprising a casing, a principal shaft journalled in said casing, a hollow rotor carried by said principal shaft and having a pair of cross-axially extending end walls respectively opposed to wall areas of said casing, a series of shafts circumferentially equally spaced about said rotor and rockably mounted therein, impeller blades fixedly secured to said rockable shafts, a pair of elements affixed respectively to said wall areas of the casing, each of said elements being disposed in an annular channel formed in the associated rotor wall and each of said elements fully occupying a section of its channel of a length sufficient to subtend an angle approximately twice the angular spacing between said blade shafts, thus forming of the unobstructed section of its channel an effective pumping chamber for the reception of impeller blades, cam means within said rotor for rocking said shafts when they are moved about said cam means by said rotor thereby to turn each blade as it enters its pumping chamber for movement with the broad side thereof leading, and to turn said blade as it leaves its pumping chamber for movement with a narrow edge thereof leading, each blade being adapted for retracting into a wall of said channels for passing by said elements, and means providing fluid inlet and discharge passages communicating with said pumping chambers.

5. In a unit capable of functioning as a motor or as a pump, the combination comprising a casing, a hollow rotor within said casing and having a cross-axially extending end wall opposed to a wall area of said casing, a series of shafts circumferentially spaced about said rotor and rockably mounted therein, impeller blades fixedly secured to said rockable shafts, an element affixed to said wall area of the casing and disposed in an annular channel formed in said rotor wall, said element occupying a section of said channel of a length sufficient to subtend an angle substantially greater than the angular spacing between said blade shafts, thus forming of the unobstructed section of said channel an effective pumping chamber for the reception of said blades, cam means within said rotor for rocking said shafts when they are moved about said cam means by said rotor thereby to turn each blade as it enters said pumping chamber for movement with the broad side thereof leading, and to turn said blade as it leaves said pumping chamber for movement with a narrow edge leading, each blade being adapted for retracting into a wall of said channel for passing by said element with sufficient clearance for accommodating back-lash, and means providing fluid inlet and discharge passages communicating with said pumping chamber.

6. In a unit capable of functioning as a motor or as a pump, the combination comprising a casing, a hollow rotor within said casing and having a cross-axially extending end wall opposed to a wall area of said casing, a series of shafts circumferentially spaced about said rotor and rockably mounted therein, impeller blades fixedly secured to said rockable shafts, an element affixed to said wall area of the casing and disposed in an annular channel formed in said rotor wall, said element occupying a section of said channel of a length sufficient to subtend an angle substantially greater than the angular spacing between said blade shafts, thus forming of the unobstructed section of said channel an effective pumping chamber for the reception of said blades, cam means within said rotor for rocking said shafts when they are moved about said cam means by said rotor thereby to turn each blade as it enters said pumping chamber for movement with the broad side thereof leading, and to turn said blade as it leaves said pumping chamber for movement with a narrow edge leading, said blades being of a width substantially in excess of the width of said channel, and being adapted for turning freely in recesses formed in the walls of said channel, and for retracting fully into said recesses for passing by said element with sufficient clearance for accommodating back-lash, and means providing fluid inlet and discharge passages communicating with said pumping chamber.

7. In a unit capable of functioning as a motor or as a pump, the combination comprising a casing, a hollow rotor within said casing and having a cross-axially extending end wall opposed to a wall area of said casing, a series of shafts circumferentially spaced about said rotor and rockably mounted therein, impeller blades fixedly secured to said rockable shafts, an element affixed to said wall area of the casing and disposed in an annular channel formed in said rotor wall, said element occupying a section of said channel of a length sufficient to subtend an angle substantially greater than the angular spacing between said blade shafts, thus forming of the unobstructed section of said channel an effective pumping chamber for the reception of said blades, cam means within said rotor for rocking said shafts when they are moved about said cam means by said rotor thereby to turn each blade as it enters said pumping chamber for movement with the broad side thereof leading, and to turn said blade as it leaves said pumping chamber for movement with a narrow edge leading, said blades being of a width substantially in excess of the width of said channel, each of said blades being adapted for turning freely in a pair of recesses formed respectively in the inner and outer walls of said channel, and for retracting fully into one of said recesses for passing by said element with sufficient clearance for accomdating back-lash, each of said blades, when positioned across said pumping chamber having a substantial area along each edge thereof overlying the surface of the associated one of said recesses for being supported thereby, and means providing fluid inlet and discharge passages communicating with said pumping chamber.

8. In a unit capable of functioning as a motor or as a pump, the combination comprising a casing, a hollow rotor within said casing and having a cross-axially extending wall, a series of shafts circumferentially spaced about said rotor and rockably mounted therein, impeller blades fixedly secured to said rockable shafts, means providing a pumping chamber in said rotor for the reception of said blades, stationary means within said rotor providing a pair of cam surfaces, a pair of cam followers circumferentially spaced about each blade shaft and engaged respectively with said cam surfaces, the latter being complementary in form thereby to positively control said shafts at all times, each said cam follower comprising a roller having inner and outer peripheral members and a resilient member therebetween and each said cam follower being preloaded against its associated cam member to compress the resilient member, said cam followers being responsive to said cam surfaces for rocking said shafts when they are moved about said cam surfaces by said rotor thereby to turn each blade as it enters said pumping chamber for movement with the broad side thereof leading, and to turn said blade as it leaves said pumping chamber for movement with a narrow edge leading, and means providing fluid inlet and discharge passages communicating with said pumping chamber.

9. The combination comprising a one-piece shaft having a pair of axially spaced coaxial shaft sections adapted for being carried in axially spaced journals, an impeller blade extending from at least one of the remote ends of said shaft sections, a pair of cam follower rollers affixed respectively to said shaft sections for rotation about axes parallel to the axis of said shaft, said rollers being disposed between said shaft sections and being angularly spaced from each other 180 degrees about the axis of said shaft, and a shaft portion interconnecting said shaft sections and eccentrically disposed for accommodating said rollers.

10. The combination comprising a one-piece shaft having a pair of axially spaced coaxial shaft bearing surface sections, and having an intermediate section provided with a pair of axially spaced radially inwardly extending recesses providing eccentrically disposed shaft portions of reduced transverse section conjointly interconnecting said axially spaced shaft sections, an impeller blade extending from at least one of the remote ends of said shaft sections, and a pair of cam follower rollers disposed respectively in said pair of recesses and journalled in the side walls thereof for rotation about axes parallel to the axis of said shaft, said rollers being angularly spaced from each other 180 degrees about the axis of said shaft.

11. A shaft assembly comprising a pair of axially spaced coaxial shaft bearing surface sections, means operatively interconnecting said shaft sections for movement as a unit about the axis of said shaft assembly, an impeller blade extending from each of the remote ends of said shaft sections, and a pair of cam follower rollers affixed respectively to said shaft sections for rotation about axes parallel to the axis of said shaft assembly, said rollers being disposed between said shaft sections and being angularly spaced from each other approximately 180 degrees about the axis of said shaft assembly.

12. A shaft assembly comprising a pair of axially spaced coaxial shafts, a train of gears operatively interconnecting said shafts for equal movement about the axis of said shaft assembly, an impeller blade extending from each of the remote ends of said shaft sections, and a pair of cam follower rollers carried respectively by said shaft sections for rotation about axes parallel to the axis of said shaft assembly, said rollers being disposed between said shaft sections and being angularly spaced from each other approximately 180 degrees about the axis of said shaft assembly.

13. The combination comprising a shaft, at least one impeller blade carried by said shaft, complementary cam means, a pair of cam followers affixed to said shaft and angularly spaced from each other approximately 180 degrees about the axis of said shaft, and a rotor turnably mounting said shaft, the latter being operable for rocking said impeller blade, and said rotor being operable for carrying said shaft about the axis of said rotor with both of said cam followers constantly in engagement with said complementary cam means, the latter being shaped to actuate said cam followers and shaft thereby to positively control and rock said impeller blade, during each revolution of said rotor, in one direction approximately 90 degrees from an initial non-pumping position to a pumping position and then back in the opposite direction to said initial non-pumping position.

14. The combination comprising a shaft assembly including a pair of axially spaced coaxial shaft sections, means operatively interconnecting said shaft sections for movement as a unit about the axis of said shaft assembly, an impeller blade fixedly secured to each of said shaft sections, and a pair of cam followers affixed respectively to said shaft sections and angularly spaced from each other approximately 180 degrees about the axis of said shaft assembly, complementary cam means, and a rotor turnably mounting said shaft sections, the latter being operable for rocking said impeller blades, and said rotor being operable for carrying said shaft assembly about the axes of said rotor with both of said cam followers constantly in engagement with said complementary cam means, the latter being shaped to actuate said cam followers and shaft sections thereby to positively control and rock said impeller blades, during each revolution of said rotor, in one direction approximately 90 degrees from an initial non-pumping position to a pumping position and then back in the opposite direction to said initial non-pumping position.

15. In a unit capable of functioning as a motor or as a pump, the combination comprising a casing, a hollow rotor within said casing and having a cross-axially extending end wall opposed to a wall area of said casing, a series of shafts circumferentially spaced about said rotor and rockably mounted therein, impeller blades fixedly secured to said rockable shafts, a valve element disposed in an annular channel formed in said rotor wall, said element being substantial in length and forming of the unobstructed section of said channel an effective pumping chamber for the reception of said blades, and being affixed to said wall area of the casing by one end portion only, the opposite end portion being provided with wall areas defining an open channel facing said wall area of the casing, said wall areas defining the open channel being movable under the influence of fluid pressure within said open channel to seal against the walls of said annular channel thereby to prevent leakage of fluid past said element, cam means within said rotor for rocking said shafts when they are moved about said cam means by said rotor thereby to turn each blade as it enters said pumping chamber for movement with the broad side thereof leading, and to turn said blade as it leaves said pumping chamber for movement with a narrow edge leading, each blade being adapted for retracting into a wall of said annular channel for passing by said element, and means providing fluid inlet and discharge passages communicating with said pumping chamber.

16. In a unit capable of functioning as a motor or as a pump, the combination comprising a casing, a hollow rotor within said casing and having a cross-axially extending end wall opposed to a wall area of said casing, a series of shafts circumferentially spaced about said rotor and rockably mounted therein, impeller blades fixedly secured to said rockable shafts, a valve element disposed in an annular channel formed in said rotor wall, said element being substantial in length and forming of the unobstructed section of said channel an effective pumping chamber for the reception of said blades, and being affixed to said wall area of the casing by one end portion only, the opposite end portion being provided with wall areas defining an open channel facing said wall area of the casing and adapted for receiving fluid to be discharged from said pumping chamber, said wall areas defining the open channel being movable under the influence of fluid pressure within said open channel to seal against the walls of said annular channel thereby to prevent leakage of fluid past said element, cam means within said rotor for rocking said shafts when they are moved about said cam means by said rotor thereby to turn each blade as it enters said pumping chamber for movement with the broad side thereof leading, and to turn said blade as it leaves said pumping chamber for movement with a narrow edge leading, each blade being adapted for retracting into a wall of said annular channel for passing by said element, and means providing fluid inlet and discharge passages communicating with said pumping chamber, said open channel being in registry and in direct communication with the fluid outlet passage from said pumping chamber.

17. The combination comprising a shaft, at least one impeller blade fixedly secured to said shaft, a ring, a link pivotally connected to said shaft and ring, the pivotal connection to said shaft being laterally spaced from the axis of said shaft, a circular cam within and concentric with said ring, and a rotor turnably mounting said shaft, said circular cam and ring being disposed eccentrically relative to said rotor, and said rotor carrying said shaft about the axis of said rotor, whereupon said cam, ring and link coact to vary the effective distance between the axis of the rotor and the pivotal connection of said link with said shaft thereby to positively control and rock said impeller blade, during each revolution of said rotor, in one direction approximately 90 degrees from an initial non-pumping position to a pumping position and then back in the opposite direction to said initial non-pumping position.

18. The combination comprising a plurality of shafts arranged in a circle, at least one impeller blade fixedly secured to each of said shafts, a ring, a link pivotally connecting each of said shafts with said ring, the pivotal connection to each shaft being laterally spaced from the axis of the shaft and the pivotal connections to said ring being arranged in a circle concentric with said ring, a circular cam within and concentric with said ring, antifriction means interposed between said cam and ring, and a rotor turnably mounting said shafts, said circular cam and ring being disposed eccentrically relative to said rotor, and said rotor carrying said shafts about the axis of said rotor, whereupon said cam, ring and links coact to vary the effective distance between the axis of the rotor and the pivotal connections of said links with said shafts thereby to positively control and rock said impeller blades, during each revolution of said rotor, in one direction approximately 90 degrees from an initial non-pumping position to a pumping position and then back in the opposite direction to said initial non-pumping position.

19. The combination comprising means providing a pump chamber having inlet and outlet openings, a shaft, at least one impeller blade fixedly secured to said shaft and adapted for being moved through said pump chamber and past said inlet and outlet openings, complementary cam means, a pair of cam followers affixed to said shaft and angularly spaced from each other approximately 180 degrees about the axis of said shaft, and a rotor turnably mounting said shaft, and said rotor carrying said shaft about the axis of said rotor with both of said cam followers constantly in engagement with said complementary cam means, the latter being shaped to actuate said cam followers and shaft thereby to positively control said impeller blade, rocking it in one direction approximately 90 degrees from an initial non-pumping position to a pumping position when it is in the region of said inlet opening, causing it to dwell in said pumping position as it moves through said pumping chamber, rocking it back in the opposite direction to said initial non-pumping position when it is in the region of said outlet opening, and causing it to dwell in said non-pumping position as it moves from the region of said outlet opening to the region of said inlet opening.

20. The combination comprising a one-piece shaft having a pair of axially spaced outer shaft sections, each outer shaft section having a bearing surface for a journal, an impeller blade extending from at least one of the remote ends of the outer shaft sections, a first cam follower roller affixed to the axial inner end of one of said outer shaft sections, a second cam follower roller affixed to the axial inner end of the other of said outer shaft sections, both of said rollers being mounted for rotation about axes parallel to the axis of the shaft, said rollers being axially spaced and being angularly spaced from each other about the axis of the shaft and a connecting shaft section interconnecting said outer shaft sections, the portions of the connecting section lying in the transverse axial planes in which the rollers lie respectively being on one side of a plane containing the axes of the rollers and the axis of the shaft.

References Cited in the file of this patent
UNITED STATES PATENTS

| | | |
|---|---|---|
| 2,151,484 | Nordling | Mar. 21, 1939 |
| 2,157,141 | Murray | May 9, 1939 |
| 2,460,821 | Hamren | Feb. 8, 1949 |
| 2,604,853 | Taylor | July 29, 1952 |
| 2,619,913 | Longenecker | Dec. 2, 1952 |